May 12, 1970      O. R. JOHANSSON      3,510,915

INJECTION MOLDING MACHINE PRESSURE BALANCED DRIVE SHAFT

Filed April 18, 1968      3 Sheets-Sheet 1

INVENTOR.
OSKAR R. JOHANSSON

BY

ATTORNEYS

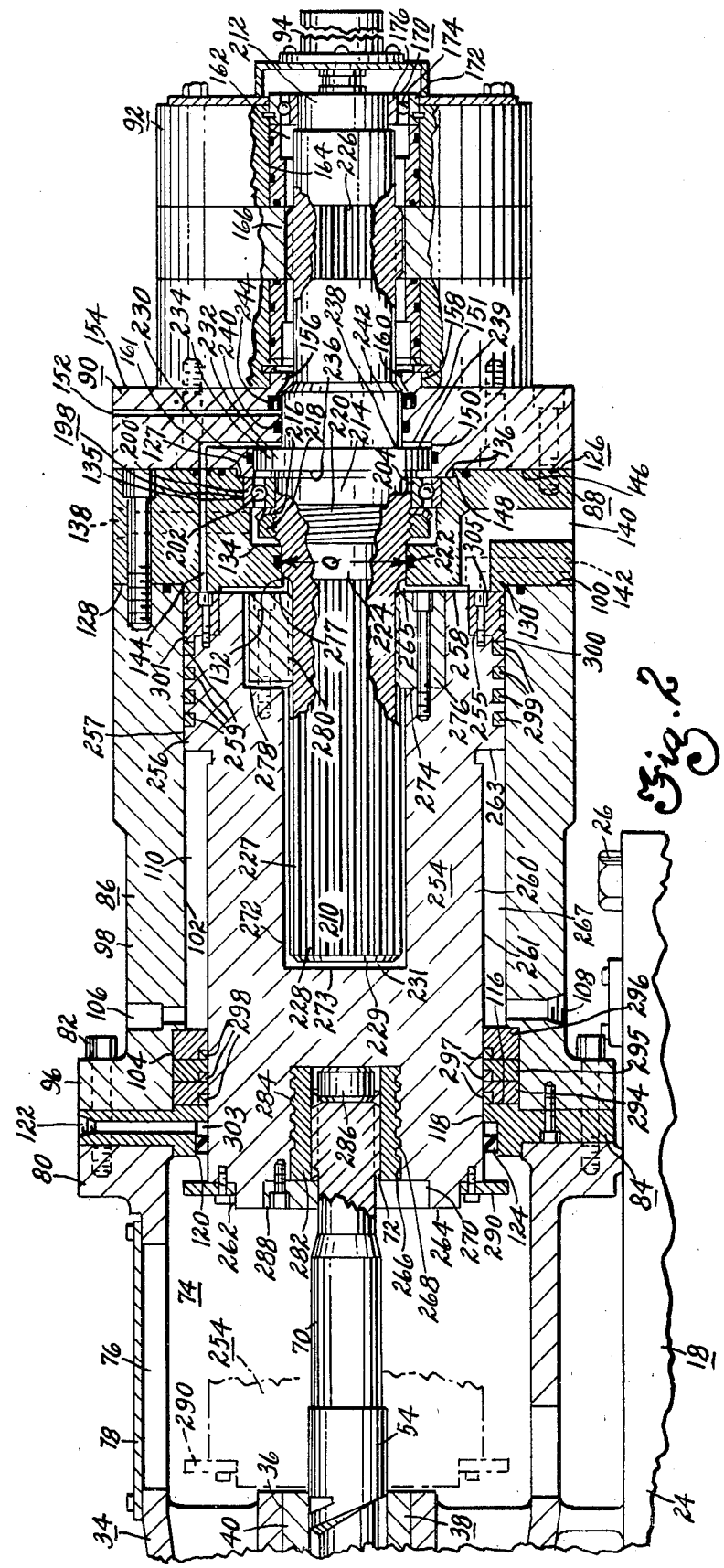

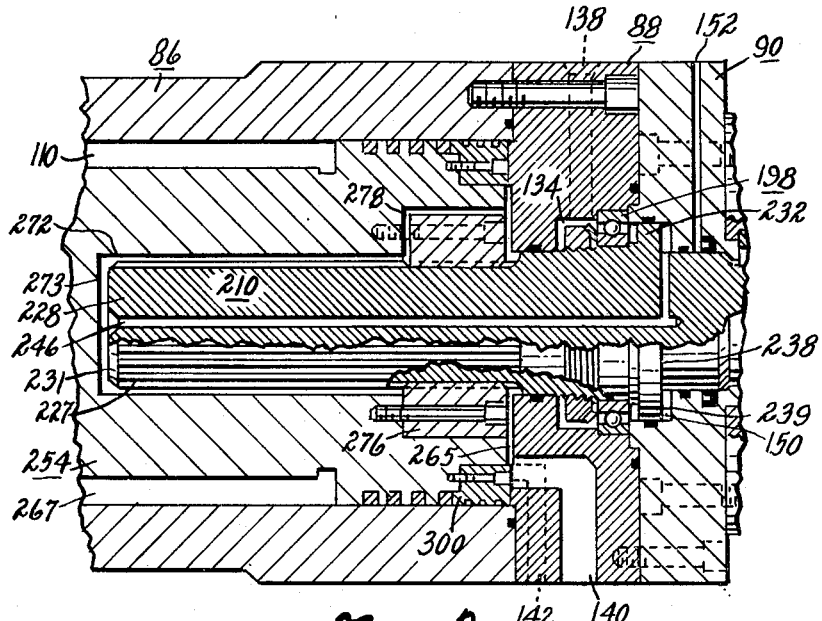
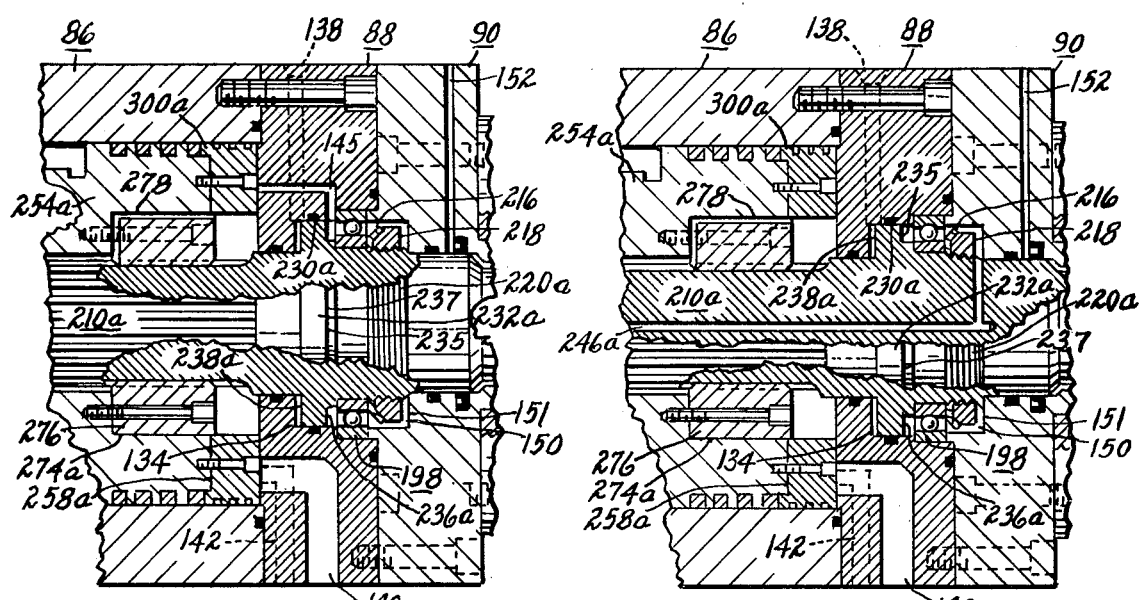

United States Patent Office 3,510,915
Patented May 12, 1970

3,510,915
INJECTION MOLDING MACHINE PRESSURE BALANCED DRIVE SHAFT
Oskar R. Johansson, Cincinnati, Ohio, assignor to The Cincinnati Milling Machine Co., Cincinnati, Ohio, a corporation of Ohio
Filed Apr. 18, 1968, Ser. No. 722,449
Int. Cl. B29f 1/06
U.S. Cl. 18—30                                      12 Claims

ABSTRACT OF THE DISCLOSURE

In a reciprocating screw injection molding machine wherein independently controlled rotary and axial movements are imparted to the plasticizing screw by a piston-cylinder motor having its reciprocable piston slidingly driven by a rotary splined shaft driven in turn by a separate motor means, the improvement comprising an enclosed drive shaft flange portion outside the cylinder bore, with the total effective area of the axial flange face facing away from the cylinder being substantially equal to the total effective area of the axial end face of the drive shaft portion engaging the piston, and conduit means connecting these areas whereby the sum of the axial fluid pressure forces acting on the drive shaft approaches zero and obviates the need for an axial thrust bearing.

BACKGROUND OF THE INVENTION

This invention relates to injection molding machines, particularly to the reciprocating screw type machine suitable for the injection molding of plastic and elastomeric materials. Conventional molding apparatus of the reciprocating-rotating screw type usually includes an injection cylinder or chamber having a bore, wherein the plasticizing screw rotates in such a manner so as to allow the solid molding material to enter the cylinder and be plasticized as it advances in the direction of screw feed. Attached on one end of the injection cylinder is a nozzle in communication with a mold sprue. As the plasticized material is deposited at the metering or front end of the plasticizing screw, it develops a back pressure that forces the plasticizing screw to retract in the cylinder bore and when the plasticized material reaches a predetermined volume, or shot size, the retracting screw contacts a limit switch and stops its rotation. At this stage, the shot is ready for injection into the mold, generally upon receipt of a signal that the mold is ready for injection, whereupon the plasticizing screw is driven forward hydraulically to inject the shot. Upon receipt of another signal, the plasticizing screw again starts to rotate and gradually retracts as a fresh shot is built up in the injection cylinder. Thus, the plasticizing screw reciprocates once per machine cycle to plasticize and inject a shot of material.

In order to perform its plasticizing and injection functions a plasticizing screw must have imparted to it both rotary and axial movements which must be independently controllable without interfering with each other. A known way to accomplish these functions is to utilize a piston-cylinder motor including a piston received in the cylinder for a rotary movement about its axis relatively to the cylinder and for axial movement relative to the cylinder, with the cylinder being fixed and the piston having a plasticizing screw attached thereto for rotation and axial movement and a rotary splined drive shaft, driven by a motor means and fixed against axial movement relative to the cylinder, extending co-axially with the piston-cylinder motor into sliding driving engagement with the piston. This construction, through workable, suffers from serious defects, namely in that it requires sealing against a spline and produces a force acting against the axial end face of the drive shaft portion received in the piston. Axial movement of the piston produces almost certain leakage of fluid into the splined bore of the piston since sealing against a spline is always difficult. This leakage into and subsequent purging thereof from the piston bore produces a rearward reaction on the end surface of the splined rotary shaft which necessitates the incorporation of a thrust race or bearing in the cylinder or motor means.

SUMMARY OF THE INVENTION

This invention solves the previously mentioned problems by not only not sealing against the spline but even incorporating a conduit between the piston bore and cylinder bore behind the piston to allow free flow of fluid between these bores upon axial movement of the piston, as a result of which pressure will build up in the piston bore thereby resulting in an axial force against the total effective area of the end surface of the drive shaft. In order to balance this axial force, the drive shaft has an enclosed flange portion, located outside of the injection cylinder bore, that has an annular rear face facing away from the injection cylinder having a total effective area connected to and substantially equal to the total effective area of the drive shaft end surface. Connecting these surfaces of substantially equal area by means of a conduit, substantially the same fluid pressure will be obtained on both areas and will generally balance the axial force on the drive shaft.

In summary, this invention provides an injection molding machine comprising in combination a plasticizing chamber with a through-passage, a plasticizing screw in the passage, means for admitting molding material to the plasticizing screw, a piston capable of simultaneous rotation and axial displacement secured to the plasticizing screw, a fluid pressure actuated cylinder peripherally surrounding the piston with the piston being axially displaceable within the cylinder, a rotatable drive shaft having one end slidingly but nonrotatably secured to the piston, the drive shaft having an enclosed flange portion outside of the cylinder bore with the total effective area of the axial annular flange face facing away from the cylinder being substantially equal in size to the total effective area of the axial end face of the drive shaft portion slidingly secured to the piston, motor means for rotating the drive shaft, and conduit means connecting the substantially equal-size areas for balancing any hydraulic force acting against the axial end face of the drive shaft portion engaging the piston as a result of fluid pressure buildup caused by axial displacement of the piston with a substantially equal and opposite force applied to the annular flange face facing away from the cylinder. In addition, the conduit means connecting the surfaces of substantially equal area may be incorporated into the drive shaft or parts of the conduit means may be incorporated into the cylinder end cap, adaptor plate and piston.

Other features and advantages to the present invention should be readily apparent by reference to the following specification, considered in conjunction with the accompanying drawings and it is to be understood that any modification may be made in the exact structural details there shown and described, within the scope of the appended claims without departing from or exceeding the spirit of the invention.

DRAWING DESCRIPTION

FIG. 2 is a longitudinal sectional view of the injection unit drive means.

3

Figure 1:
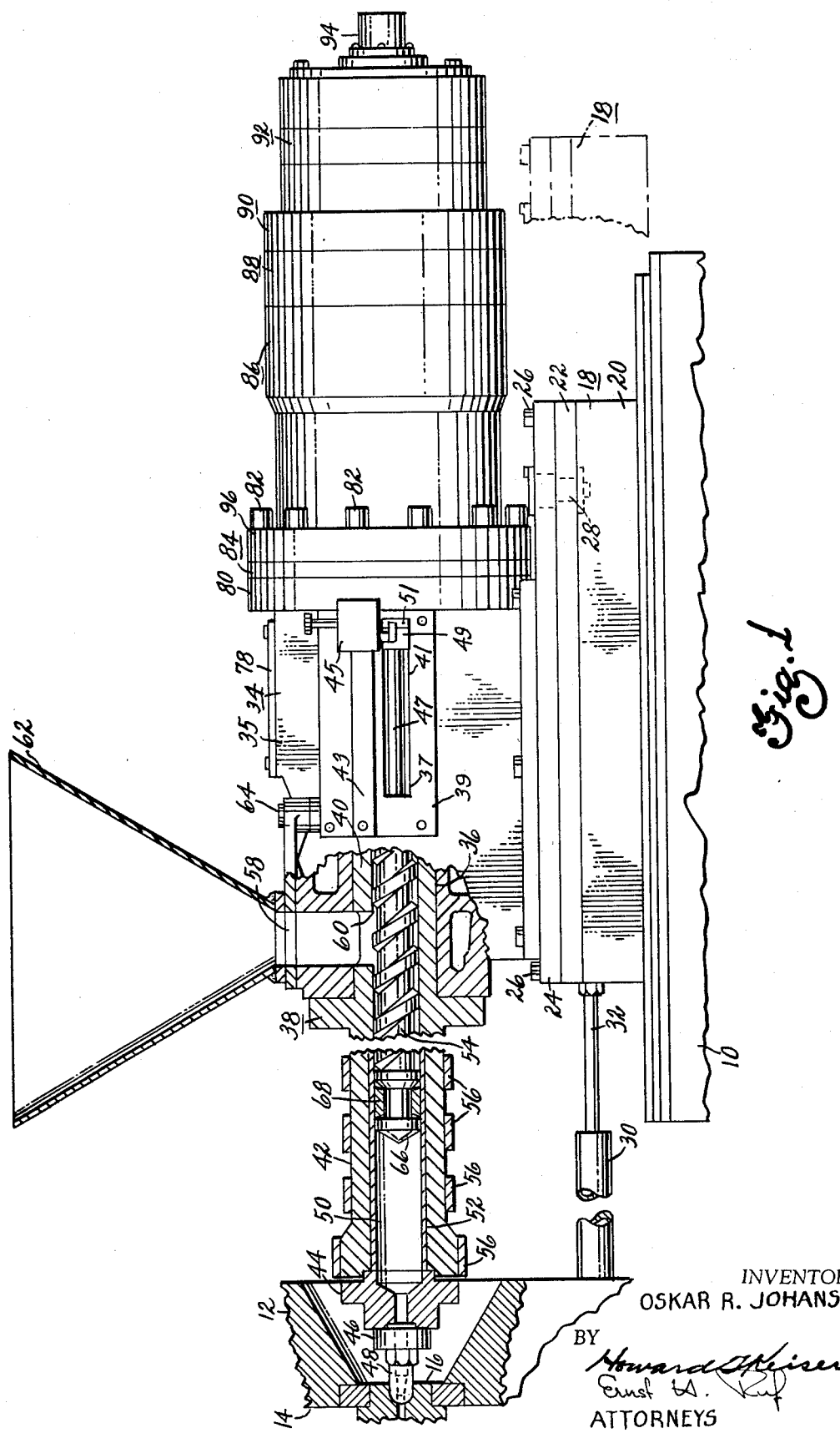
FIG. 1 is an elevational view, partly in section, of an injection molding machine.

FIG. 3 is a fragmentary sectional view of a modified embodiment of the injection unit drive means of FIG. 2.

FIG. 4 is a fragmentary sectional view of another modified embodiment of the injection unit drive means of FIG. 2.

FIG. 5 is a fragmentary sectional view of a modified embodiment of the injection unit drive means of FIG. 4.

DETAILED DESCRIPTION

Referring now to the drawings in detail FIG. 1 shows the injection molding machine comprising machine frame 10, only a small portion of which is shown in the figure and which supports platen 12 having vertical rear face 14 against which a mold 16 is clamped. A base 18 is slidably mounted on another part of frame 10 and is connected to platen 12 by hydraulic cylinder 30 having ram 32 connected to base 18. Base 18 is basically composed of bed portion 20 having attached thereto intermediate plate 22 and top plate 24. Swivel pin means 28 extends through plates 22 and 24 into bed portion 18 and upon removal of screws 26 top plate 24 may be swiveled around pin means 28 in a plane parallel to the top surface of plate 22.

Mounted on base 18 is housing 34 having an open central bore portion 36 into which rear portion 40 of plasticizing chamber or cylinder 38 is fixedly slide-fitted. Front portion 42 of plasticizing chamber 38 extends outwardly from housing 34 and is closed off by cylinder end plate 44 having nozzle adaptor 46 and nozzle 48 attached thereto. Plasticizing chamber 38 is a long cylindrical chamber with circular through passage 50 having liner 52 with passage 50 being occupied by rotatable and reciprocable plasticizing screw 54. Surrounding plasticizing cylinder front portion 42 are a plurality of heating elements 56. Housing 34 has inlet throat 58 aligned with opening 60 in plasticizing chamber rear portion 40. Material to be plasticized is fed from hopper 62, located above inlet throat 58 and pivotable around pin 64 on housing 34, through throat 58 and opening 60 into plasticizing chamber 38 where it will be transported upon rotation of plasticizing screw 54 toward the left as viewed in FIG. 1 and becomes gradually plasticized by the heat imparted by heating elements 56. Attached to the end of plasticizing screw 54 nearest to nozzle 48 is screw tip 66 having anti-flow-back valve 68 interposed therebetween.

As best seen in FIG. 2 plasticizing screw 54 has spindle end portion 70, having splined portion 72, extending into housing cavity 74, access to which may be had through housing opening 76 closed by cover 78. Attached to housing rear flange 80 by bolts 82 are retainer 84 and injection cylinder 86, the latter having attached to it end cap 88, adaptor plate 90, and motor means 92 having tachometer drive means 94 all of which will now be described in detail.

Referring now to FIG. 2, which is a longitudinal sectional view of the injection unit drive means, stepped injection cylinder 86, having flanged end portion 96 attached to housing rear flange 80, has body portion 98 with rear end face 100, inner peripheral surface 102 with recessed portion 104, cylinder cavity 110 and aligned circumferentially spaced radial openings 106, 108 located near inner peripheral surface recessed portion 104. Interposed between housing rear flange 80 and injection cylinder flanged end portion 96 and attached to the latter is generally annular shaped retainer 84 having end surface 116, inner peripheral surface 118 with recessed portion 120 and radial opening 122 extending outwardly from portion 120. Attached to injection cylinder 86 and abutting cylinder end face 100 is generally annular shaped end cap 88 having rear end surface 126 with recessed portion 127, front end surface 128 having stepped portion 130, inner peripheral surface 132 having stepped portions 134, 135, 136, radial opening 138 extending outwardly from stepped portion 134, L-shaped circumferentially spaced openings

4

140, 142 initially perpendicular to stepped front end surface portion 130 and then extending radially outwardly parallel to rear end surface 126, and conduit 144 perpendicular to end surfaces 126, 130. Secured to end cap 88 and abutting end cap rear end surface 126 is generally annular-shaped adaptor plate 90 composed of front end surface 146 having stepped portion 148 and recessed portion 150 having area 151, rear end surface 154 having stepped portion 156 with outer peripheral surface 158, stepped inner peripheral surface 160, radial opening 152 extending outwardly from inner peripheral surface 160, and L-shaped circumferentially spaced conduit 161 initially co-axial with conduit 144 then extending radially inwardly to inner peripheral surface 160. Fixedly attached to adaptor plate 90 and abutting adaptor plate rear end surface 154 is generally annular motor means 92 having internal driving splines 166 extending into motor means central bore 162 having inner peripheral surface 164. Adaptor plate rear end surface stepped portion 156 extends a short distance into central bore 162 with one end of inner peripheral surface 164 being located on the outer peripheral surface 158 of stepped portion 156. Secured to and extending a short distance into the other end of bore inner peripheral surface 164 is outer race 172 of bearing 170 also having rolling element 174 and inner race 176.

Abutting retainer front end surface stepped portion 148 and located and retained on end cap inner peripheral surface stepped portion 135 is outer race 200 of bearing 198 also having rolling element 202 and inner race 204.

Journaled by bearings 170 and 198 and axially extending into piston bore 272 is stepped cylindrical drive shaft 210, which also doubles as the output shaft of motor means 92. Drive shaft 210 having its journal portions 212 and 214 surrounded by bearing inner races 176 and 204 respectively, is restrained against axial movement by lock washer 216 pressed against bearing inner race 204 by lock nut 218 threaded onto drive shaft threaded portion 220. Shaft seal 222, secured in a recess in end cap inner peripheral surface 132, seals against shaft journal portion 224, while shaft seal 230, secured in a recess in adaptor plate stepped inner peripheral surface 160 seals against outer peripheral surface 234 of shaft flange 232 having axial annular flange front face 236, and rear face 238 with the latter having area 239. Shaft seal 240 and wiper seal 244, both secured in recesses in adaptor plate stepped inner peripheral surface 160 seal against shaft journal portion 242. Mating with motor means internal driving splines 166 is drive shaft first splined portion 226. Extending from drive shaft journal portion for a substantial distance into piston bore 272 and axially aligned therewith is drive shaft second splined portion 228 having splines 227.

Stepped cylindrical double acting piston 254, axially aligned with both drive shaft 210 and plasticizing screw 54 and axially extending from injection cylinder cavity or bore 110 a short distance into housing cavity 74, is essentially composed of head portion 256 with top surface 258 and bottom surface 263, as well as skirt portion 260 with recess 262. Extending into piston skirt end surface 264 is concentric bore 266 having inner left-hand acme threaded portion 268 and outer recess portion 270. Internally splined piston bushing 282 having partially threaded outside diameter portion 284 is inserted into and mates with threaded portion 268 of piston bore 266. Plasticizing screw 54 is axially aligned with piston 254 and plasticizing screw splined portion 72 is inserted into splined bushing 282 and abuts spacer 286. Stop plate 288 is inserted into and secured in recessed portion 270 of bore 266 and restrains plasticizing screw splined portion 72 against movement with respect to splined bushing 282 and piston 254. Annular cam 290, larger in outside diameter than piston 254, is fitted on piston skirt recess portion 262 and abuts and is secured to piston skirt portion 260.

Axially extending into piston head top surface 258, having multiple outer circumferential recesses 259, and through piston head portion 256 for a substantial length into piston skirt portion 260 is concentric bore 272 having end face 273 and outer recess portion 274. Fixedly attached to piston head portion 256 and located in recess portion 274 is generally annular shaped drive spline 276 having flat front face 277, L-shaped channel or conduit 278 and internal splines 280, with conduit 278 allowing the free flow of oil between injection cylinder bore 110 and piston bore 272. Internal splines 280 slidingly mate with drive shaft second splined portion 228 having end surface 229. The diameter of outer peripheral surface 261 of piston skirt portion 260 is slightly less than the diameter of retainer inner peripheral surface 118, while the diameter of outer peripheral surface 257 of piston head portion 256 is only slightly less than the diameter of injection cylinder inner peripheral surface 102. Held against movement in injection cylinder recessed portion 104 by retainer rear end surface 116 are three stationary retainer rings 294, 295, 296, each having an inner circumferential recess 297, with each recess 297 containing a piston ring 298 bearing and sealing against piston skirt outer peripheral surface 261. Retainer ring 296 is preferably made of bronze. Seal 124, held in retainer inner peripheral surface recessed portion 120, seals against piston skirt outer peripheral surface 261 and helps define peripheral channel 303 from which opening 122 extends radially outwardly.

Outer circumferential recesses 259 in piston head portion 256 each contain a piston ring 299 bearing and sealing against injection cylinder inner peripheral surface 102. Interposed between recessed portion 255 of piston head top surface 258 and end cap front end surface stepped portion 130 and attached to piston head portion 256 is movable retainer ring 300 having flat front surface 305, and stepped rear surface 301. Movable retainer ring 300, which is preferably made of bronze, has an outside diameter that is substantially similar to the diameter of injection cylinder inner peripheral surface 102. Piston head top surface 258, drive spline flat front face 277 and retainer ring flat front surface 305 all lie in the same plane.

As shown in FIG. 1, attached to but spaced from front side 35 of housing 34 having opening 37 is mount plate 39 having generally rectangular opening 41. Attached to but spaced from mount plate 41 above opening 37 is guide bar 43 carrying thereon longitudinally adjustable limit switch 45 of known construction, which is utilized as a stroke adjusting means. Slide bar 47 located behind housing opening 37 journals reciprocable cam follower 49 having cam portion 51 for tripping limit switch 45 and a slotted rear portion (not shown) extending into housing cavity 74, with an outer portion of cam 290, mounted on piston skirt recess 262, being able to rotate through the slotted rear portion (not shown).

In operation, motor means 92, preferably a low speed high torque hydraulic motor, by means of internal driving splines 166 mating with drive shaft first splined portion 226, rotates drive shaft 210 journaled in rolling element bearings 170 and 198. Drive shaft second splined portion 228, slidingly fitting through annular drive spline 276 into piston bore 272, rotates piston 254 and by reason of plasticizing screw spindle end splined portion 72, mating with and axially retained by stop plate 288 in splined piston bushing 282 retained in piston skirt concentric bore 266, thereby rotates plasticizing screw 54. Thus it may be seen that rotation of plasticizing screw 54 by motor means 92 is in a direct in-line manner, with motor means 92, drive shaft 210, piston 254 and plasticizing screw 54 all being axially aligned. Drive shaft 210, in addition to rotating piston 254, also serves as the output shaft of motor means 92. Rotation of piston 254 in addition to rotating plasticizing screw 54 also rotates annular cam 290 and in rotation, piston skirt outer peripheral surface 261 is journaled on the inner peripheral surface of stationary retainer ring 296 and piston head portion 256 is journaled on injection cylinder inner peripheral surface 102 by the outer peripheral surface of movable retainer ring 300 attached to piston head top surface recessed portion 255.

As plasticizing screw 54 rotates, the molding material entering into plasticizing cylinder 38 is transported to the left as viewed in FIG. 1 and is deposited in front of plasticizing screw tip 66. As the plasticized material is deposited in front of screw tip 66, it develops a back pressure that forces plasticizing screw 54 to axially retract (to the right as viewed in FIGS. 1 and 2) in relation to plasticizing cylinder 38, thereby also axially retracting piston 254 with drive spline 276 sliding on drive shaft second splined portion 228, while the retainer ring outer peripheral surface slides on injection cylinder inner peripheral surface 102. In addition, as previously noted, piston rings 298 in stationary retainer rings 294, 295, 296 bear and seal against piston skirt outer peripheral surface 261, and piston rings 299 in piston head outer circumferential recesses 259 bear and seal against injection cylinder inner peripheral surface 102. When the plastic material in front of screw tip 66 reaches a predetermined volume, or shot size, cam follower 49, which is axially moved along slide bar 47 by annular cam 290, contacts and moves limit switch 45 with its cam portion 51, thereby tripping limit switch 45 which had previously been axially adjusted on guide bar 43 so as to limit the length of axial retraction of plasticizing screw 54 to give the correct shot size. Tripping of limit switch 45 provides a signal for a switching means (not shown) of known construction which stops the rotation of motor means 92.

Upon receipt of another signal, emanating for example from mold 16, and confirming that it is ready for injection, fluid, from a means such as fluid source under pressure (not shown) connected to end cap 88, is directed into and through end cap L-shaped openings 140, 142 against movable retainer ring flat front surface 305 piston head top surface 258 and drive spline flat front face 277 thus axially displacing annular double-acting piston 254, and consequently moving plasticizing screw 54 to the left as viewed in FIGS. 1 and 2 thereby injecting the plasticized material in front of screw tip 66 through nozzle 48 into mold 16. Piston 254 is axially displaced until piston head portion bottom surface 263 mechanically abuts stationary retainer ring 296. Upon this mechanical abutment piston 254 and annular cam 290 are axially moved into the positions shown (in FIG. 2) in phantom lines in housing cavity 74. Even after this abutment fluid pressure is maintained for a predetermined time on surfaces 305, 258, and 277.

Upon receipt of another signal, for example from a timer (not shown) the fluid pressure on surfaces 305, 258 and 277 is released and motor means 92 is again actuated thus rotating plasticizing screw 54 which starts plasticizing molding material entering into piston cavity 38 thereby forcing plasticizing screw 54 to start axially retracting (to the right as viewed in FIGS. 1 and 2). Starting of axial retraction of plasticizing screw 54 also starts axial retraction of piston 254 thereby starting to force the fluid into piston head cavity 265, out therefrom through end cap L-shaped openings 140, 142 and through an adjustable relief valve (not shown) back to a reservoir (not shown). The distance between stationary retainer ring 296 and piston head portion bottom surface 263 when piston 254 is in its rear most position, i.e., when movable retainer ring front surface portion 305 abuts end cap front end surface stepped portion 130 is the maximum stroke length of piston 254 which is also the maximum axial stroke length of cam follower 49, with limit switch 45 being infinitely variably adjustable over this stroke length. Depending on the shot size required, limit switch 45 is set for a predetermined stroke length on guide bar 43, as previously described. Tripping of limit switch 45 stops rotation of motor means 92 and the injection molding machine is now ready for another cycle as just described. Thus plasticizing screw 54 reciprocates once per machine cycle to plasticize and inject a shot of material.

If axial retraction without rotation of plasticizing screw 54 is desired, fluid, from a fluid source under pressure (not shown) connected to injection cylinder 86, is directed into and through injection cylinder radial openings 106, 108 into the piston skirt cavity 267, thereby axially retracting piston 254 (to the right as viewed in FIGS. 1 and 2). Partial or full retraction of plasticizing screw 54 is obtained by means of external valving (not shown). Upon subsequent axial advance of plasticizing screw 54 (to the left as viewed in FIGS. 1 and 2), the fluid in piston skirt cavity 267 is forced out therefrom through injection cylinder radial openings 106, 108 and through a relief valve (not shown) back to a reservoir (not shown).

As previously noted, piston rings 298 bear and seal against piston skirt outer peripheral surface 261 and piston rings 299 bear and seal against injection cylinder inner peripheral surfacee 102, but if fluid should leak past piston rings 299 and/or piston rings 298 and retainer inner peripheral surface 118, it will enter peripheral channel 303 from whence it will flow through retainer radial opening 122 into a reservoir (not shown) connected thereto.

When fluid under pressure is forced in through end cap L-shaped openings 140, 142 against surfaces 305, 258, and 277, pressure will build up over this area and by reason of leakage past splines 227 and 280 as well as by free flow through L-shaped conduit or channel 278, pressure will build up in bore 272 thereby resulting in an axial force against the total effective area 231 of the axial end face of drive shaft portion 228. It should be noted that totol effective area 231 is not end surface 229 of drive shaft splined portion 228 but is rather substantially equal to the right corss-sectional area Q of drive shaft journal portion 224 under shaft seal 222 since the axial force acts against drive shaft portion 228 up to shaft seal 222.

With fluid under pressure acting on the total effectve area 231, an axial force is applied to drive shaft 210 that is equal to area 231 (or area Q) multiplied by the fluid pressure, and if no other means are provided, this axial force (to the right as viewed in FIG. 2) has to be taken up by bearing 198.

In order to balance this axial force, drive shaft flange 232, located outside of injection cylinder bore or cavity 110, has annular rear face 238 having area 239, facing away from injection cylinder 86 and sealed between seals 230 and 240, connected to and substantially equal to total effective area 231 of drive shaft portion 228. It should be noted that the total effective area of annular rear face 238 is equal to area 239 which is also substantially equal to area 151 of end cap front recessed portion 150.

Areas 231 and 239 are substantially equal and by connecting them substantially the same oil pressure will be obtained on both areas and will generally balance the axial force on drive shaft portion 228. The conduit connecting areas 231 and 239 starts at piston bore end face 273 extends along splines 227 and/or splines 280 and conduit 278 into piston head cavity 265 and extends thererfom as conduit 144 and ends as conduit 161 leading to flange face 238.

Radial opening 152 serves as a drain port and is connected to a reservoir (not shown) in order to collect any fluid leaking past seal 240, with wiper seal 244 preventing further leakage along drive shaft journal portion 242. Radial opening 138 also serves as a drain port and is connected to a reservoir (not shown) in order to collect any fluid leaking past shaft seals 222 and 230.

By reason of the fluid pressure connection of substantially equal areas 231 and 239 the axial force on drive shaft 210 is alway essentially balanced, regardless of whether piston bore 272 is being filled with fluid during piston advancement or emptied of fluid during piston retraction.

The structure of FIG. 3, which is a fragmentary sectional view of a modified embodiment of the injection unit drive means of FIG. 2, except for deletions of end cap conduit 144, as well as adaptor plate conduit 161, and the addition of L-shaped drive shaft conduit 246 is identical to the structure of FIG. 2. The incorporation of drive shaft conduit 246 in drive shaft 210 permits the direct linking of areas 231 and 239, but the operation of the FIG. 3 embodiment remains substantially similar to that of the structure of FIG. 2.

The structure of FIG. 4, is a fragmentary sectional view of another modified embodiment of the injection unit drive means of FIG. 2. Minor changes from the structure of FIG. 2 includes the deletions of the end cap conduit 144 as well as adaptor plate conduit 161, and the addition of L-shaped end cap conduit 145. More extensive changes include the use of modified drive shaft 210a which is identical to drive shaft 210 except for the reversal of drive shaft threaded portion 220 and drive shaft flange 232, i.e. threaded portion 220a, with lock washer 216 and lock nut 218, is now located to the right of bearing 198 and flange 232a is on the left side of bearing 198 with annular flange face 236a having area 237, and annular flange face 238a now being the rear and front axial flange faces respectively, this being a reversal of their positions of FIG. 2. It should be noted that the total effective area 235 of annular rear face 236a is not equal to area 237 but is rather substantially equal to area 151 of end cap front end recess portion 150. Total effective area 235 which is equal to area 239 of FIG. 2 is connected to and substantially equal to total effective area 231 of drive shaft portion 228. Seal 230a is now secured in a recess in end cap inner peripheral surface stepped portion 134. In addition, piston 254a which is very similar to piston 254 has deeper piston bore recess 274a so as to allow a recessed mounting of drive spline 276, modified piston head top surface 258a having modified retainer ring 300a attached thereto. The operation of the FIG. 4 embodiment however remains substantially similar to that of the structure of FIG. 2, and by reason of the fluid pressure connection of substantially equal areas 231 and 235 the axial force on drive shaft 210 is always balanced.

The structure of FIG. 5, which is a fragmentary sectional view of a modified embodiment of the injection unit drive means of FIG. 4, except for the deletion of end cap conduit 145 and the addition of L-shaped drive shaft conduit 246a is identical to the structure of FIG. 4. Similar to FIG. 3, the incorporation of drive shaft conduit 246a in drive shaft conduit 246a in drive shaft 210a permits the direct linking of areas 231 and 235, but the operation of the FIG. 5 embodiment remains substantially similar to that of the structure of FIG. 2.

The balancing of drive shaft 210 (or 210a) of this invention by means of hydraulically connecting substantially equal areas 231 and 239 (or 231 and 235) is most significant since it provides a dual benefit, namely it solves both shaft sealing and axial end thrust problems. If axial end thrust on drive shaft 210 (or 210a) is to be avoided there would have to be sealing against drive shaft second splined portion 228. Sealing against a spline is always difficult and axial movement of piston 254 (or 254a) would result in almost certain leakage of fluid into bore 272 from whence it would again have to be displaced by leakage past splined portion 228 upon axial retraction of piston 254 (or 254a). This leakage produces a rearward reaction (to the right as viewed in FIG. 2) on total axial effective area 231 of drive shaft portion 228 and would necessitate incorporation of a thrust race or bearing in either end cap 88, adaptor plate 90 or motor means 92. By pressure-balancing drive shaft 210 (210a) no spline sealing problems are encountered and the requirement of an axial thrust bearing is obviated.

While this invention has been described in connection with possible forms of embodiments thereof, it is to be understood that the present disclosure is illustrative rather than restrictive and that changes or modification may be resorted to without departing from the spirit of invention or scope of the claims which follow.

What is claimed is:

1. In an injection molding machine of the type wherein a rotatable plasticizer screw is advanced axially toward an injection mold to fill the mold and retracted therefrom to accumulate the next successive mold filling charge, the improvement comprising:
   (a) a drive shaft;
   (b) means for rotating said drive shaft;
   (c) a piston concentric with said drive shaft and the screw and securing said drive shaft and the screw for co-rotation but accomodating relative axial movement between said piston and said shaft;
   (d) a fluid pressure actuated cylinder peripherally surrounding said piston, said drive shaft having an enclosed flange portion outside of said cylinder bore with the total effective area of the axial flange face facing away from said cylinder being substantially equal to the total effective area of the axial end face of the drive shaft portion engaging said piston; and
   (e) conduit means connecting said areas whereby the sum of the axial fluid pressure forces acting on said drive shaft approaches zero.

2. An injection molding machine comprising in combination:
   (a) a plasticizing chamber with a through passage;
   (b) a plasticizing screw in the passage;
   (c) means for admitting molding material to the plasticizing screw;
   (d) a piston, capable of simultaneous rotation and axial displacement, secured to the plasticizing screw;
   (e) a fluid pressure actuated cylinder peripherally surrounding said piston, with the piston being axially displaceable within said cylinder;
   (f) a rotatable drive shaft, having one end slidingly but nonrotatably secured to said piston, said drive shaft having an enclosed flange portion outside of said cylinder bore with the total effective area of the axial annular flange face facing away from said cylinder being substantially equal in size to the total effective area of the axial end face of the drive shaft portion slidingly secured to said piston;
   (g) motor means for rotating said drive shaft; and
   (h) conduit means connecting said substantially equal-size areas, for balancing any hydraulic force acting against the axial end face of the drive shaft portion engaging said piston as a result of fluid pressure buildup caused by axial displacement of said piston with a substantially equal and opposite force applied to the annular flange face facing away from said cylinder.

3. An injection molding machine comprising in combination:
   (a) a plasticizing chamber with a circular through passage;
   (b) a reciprocable and rotatable plasticizing screw in the passage;
   (c) means for admitting molding material into the plasticizing chamber;
   (d) a rotatable, longitudinally displaceable, stepped cylindrical piston, axially aligned with and attached to the rear end of the screw and including a bore portion provided with splines along at least a portion of its length;
   (e) a fluid pressure actuated cylinder peripherally encompassing and capable of longitudinally displacing said piston;
   (f) a power operated splined drive shaft disposed in axially aligned and axially displaceable intermeshing relationship with said splined piston bore portion, said drive shaft also having an enclosed intermediate annular flange portion outside of said cylinder bore, with the total effective surface of the axial flange face facing away from said cylinder being substantially equal in area to the total effective surface of the axial end face of the drive shaft portion received in said piston bore; and
   (g) fluid conducting conduit means connecting said surfaces of substantially equal area, for balancing any force acting against the axial end face of the drive shaft as a result of fluid pressure build up in said piston bore portion upon longitudinal displacement of said piston with a substantially equal and opposite force acting on the intermediate annular flange portion of said shaft.

4. An injection molding machine comprising in combination:
   (a) a rotatable and axially movable plasticizing screw;
   (b) a piston rigidly connected with the rear end of said screw and having a bore with a splined portion;
   (c) a stationary cylinder containing the piston and having an annular rear end cap provided with a fluid passage and an annular front end retainer;
   (d) a power operated rotatable drive shaft, having one end including a splined portion sealingly extending through said cylinder end cap into axially aligned and axially displaceable intermeshing relationship with said piston bore, said drive shaft also having an enclosed intermediate annular flange portion outside of said cylinder bore with the total effective surface of the axial flange face, facing away from said cylinder, being substantially equal in area to the total effective surface of the axial end face of the drive shaft splined portion intermeshed in said piston bore;
   (e) means to deliver fluid under pressure to the cylinder bore behind the rotating piston for driving it forward against the annular front end retainer; and
   (f) a conduit, capable of conducting fluid under pressure, connecting said surfaces of substantially equal area for balancing any pressure acting against the axial end face of the drive shaft splined portion as a result of fluid leakage into said piston bore upon fluid pressure buildup in said cylinder bore, whereby said diverted pressure acting against said drive shaft axial flange face will obviate the requirement of an axial thrust bearing.

5. The injection molding machine of claim 4 wherein said conduit connecting the surfaces of substantially equal area is incorporated into said drive shaft.

6. The injection molding machine of claim 4 wherein part of said conduit connecting the surfaces of substantially equal area is incorporated into said cylinder end cap.

7. The injection molding machine of claim 6 with the addition of an annular adaptor plate attached to said cylinder end cap, with said adaptor plate having part of said conduit connecting the surfaces of substantially equal area incorporated therein.

8. The injection molding machine of claim 4 with the addition of a conduit connecting said cylinder bore behind the rotating piston with said piston bore in order to allow a free flow of oil between them as said piston is axially displaced within said cylinder.

9. The injection molding machine of claim 8 wherein said last-defined conduit is a part of said previously-defined conduit connecting the surfaces of substantially equal area.

10. The injection molding machine of claim 4 with the addition of a bearing means interposed between said drive shaft and said cylinder end cap.

11. The injection molding machine of claim 10 wherein said bearing means abuts one face of said drive shaft annular flange portion.

12. The injection molding machine of claim 11 wherein said bearing means abuts the axial flange face of said drive shaft annular flange facing away from said cylinder.

References Cited

UNITED STATES PATENTS

| | | | |
|---|---|---|---|
| 3,068,521 | 12/1962 | Gaspar et al. | 18—30 |
| 3,188,691 | 6/1965 | Stenger | 18—30 |
| 3,204,294 | 9/1965 | Brochetti | 18—30 |
| 3,301,138 | 1/1967 | Cox | 92—2 X |
| 3,386,340 | 6/1968 | Engle | 92—2 X |

J. SPENCER OVERHOLSER, Primary Examiner

M. O. SUTTON, Assistant Examiner

U.S. Cl. X.R.

18—12; 92—2